(12) United States Patent
Schuhmacher (10) Patent No.: US 10,288,474 B2
(45) Date of Patent: May 14, 2019

(54) METHOD OF DETERMINING NOISE SOUND CONTRIBUTIONS OF NOISE SOURCES OF A MOTORIZED VEHICLE

(71) Applicant: Brüel & Kjær Sound & Vibration Measurement A/S, Nærum (DK)

(72) Inventor: Andreas Percy Schuhmacher, Hvalsø (DK)

(73) Assignee: Brüel & Kjær Sound & Vibration Measurement A/ S, Nærum (DE)

( * ) Notice: Subject to any disclaimer, the term of this patent is extended or adjusted under 35 U.S.C. 154(b) by 420 days.

(21) Appl. No.: 14/899,791

(22) PCT Filed: May 13, 2014

(86) PCT No.: PCT/EP2014/059785
§ 371 (c)(1),
(2) Date: Dec. 18, 2015

(87) PCT Pub. No.: WO2014/202286
PCT Pub. Date: Dec. 24, 2014

(65) Prior Publication Data
US 2016/0138967 A1 May 19, 2016

(30) Foreign Application Priority Data
Jun. 21, 2013 (EP) .................................... 13173224

(51) Int. Cl.
*G01H 17/00* (2006.01)
*G10L 21/0216* (2013.01)
(Continued)

(52) U.S. Cl.
CPC ............... *G01H 17/00* (2013.01); *G01H 3/00* (2013.01); *G06F 17/5095* (2013.01);
(Continued)

(58) Field of Classification Search
CPC ...... G01H 17/00; G01H 3/00; G10L 21/0232; G10L 21/0216; G10L 25/48;
(Continued)

(56) References Cited

U.S. PATENT DOCUMENTS 6,427,112 B1 7/2002 Kostun
2004/0230428 A1 11/2004 Choi
(Continued)

FOREIGN PATENT DOCUMENTS

CN 102494754 A 6/2012
EP 2028651 2/2009
(Continued)

OTHER PUBLICATIONS

Junji Yoshida et al: "2013 The Japan Society of Mechanical EngineersContribution Analysis for Vehicle Interior Noise Using Only Response Signals", Apr. 25, 2013 with Google Translation.*
(Continued)

*Primary Examiner* — Yoshihisa Ishizuka
(74) *Attorney, Agent, or Firm* — Nixon Peabody LLP (57) ABSTRACT

The present invention relates to a method and an acoustic measurement system for determining individual noise sound contributions of a plurality of physical noise sources of a motorized vehicle at a target or reference location. The method comprises steps of placing a plurality of reference microphones at respective reference positions adjacent to respective ones of the physical noise sources, placing a measurement microphone at the target location, recording a plurality of noise sound signals and recording a target noise signal. The plurality of noise sound signals are adaptively separated using blind source separation to produce a plurality of mutually independent noise sound signals representing respective estimated noise sound signals of the plurality of physical noise sources. Each of the mutually independent
(Continued)

noise sound signals is correlated with the recorded target noise signal to determine time domain or frequency domain characteristics of a plurality of linear transfer path filters representing respective transfer functions between the plurality of independent noise sound signals and the measurement microphone at the target location. At least one of the independent noise sound signals, representing one of the physical noise sources, may be applied to the corresponding linear transfer path filter to generate at least one target noise signal component representing the individual noise sound contribution of the physical noise source at the target location.

20 Claims, 7 Drawing Sheets (51) Int. Cl.
    *G06F 17/50*     (2006.01)
    *G10L 25/48*     (2013.01)
    *G10L 21/0272*     (2013.01)
    *G01H 3/00*     (2006.01)
    *G10L 21/0232*     (2013.01)

(52) U.S. Cl.
    CPC ...... *G10L 21/0216* (2013.01); *G10L 21/0232* (2013.01); *G10L 21/0272* (2013.01); *G10L 25/48* (2013.01); *G06F 2217/82* (2013.01); *G10L 2021/02166* (2013.01)

(58) Field of Classification Search
    CPC ....... G10L 21/0272; G10L 2021/02166; G06F 17/5095; G06F 2217/82; Y02T 10/82
    See application file for complete search history.

(56) References Cited

U.S. PATENT DOCUMENTS

| | | | |
|---|---|---|---|
| 2005/0060142 A1 | 3/2005 | Visser | |
| 2008/0181422 A1* | 7/2008 | Christoph | G10K 11/17817 381/73.1 |
| 2011/0103617 A1 | 5/2011 | Shin | |
| 2012/0288124 A1* | 11/2012 | Fejzo | H04R 5/02 381/303 |
| 2012/0308036 A1* | 12/2012 | Christoph | H03G 3/32 381/86 |
| 2013/0031152 A1 | 1/2013 | Sun | |

FOREIGN PATENT DOCUMENTS

| | | | |
|---|---|---|---|
| JP | H11-94642 A | 4/1999 | |
| JP | H11-326036 A | 11/1999 | |

OTHER PUBLICATIONS

De Klerk D, et al: "Operational Transfer Path Analysis: Theory, Guidelines and Tire Noise Application", Mechanical Systems and Signal Processing, London, GB. vol. 24, No. 7, Oct. 1, 2010, pp. 1950-1962, XP027154611.

Hansen, Lars Kai, and Mads Dyrholm "A Prediction Matrix Approach to Convolutive ICA" in IEEE 2003 (10 pages).

Jakob Putner et al: "Operational Transfer Path Analysis Predicting Contributions to the Vehicle Interior Noise for Different Excitations from the Same Sound Source", InterNoise 2012, Aug. 22, 2012, XP055090134 (12 pages).

Jean-Francois Cardoso: "Blind Signal Separation: Statistical Principles", Proceedings of the IEEE, Oct. 10, 1998, pp. 2009-2025, XP055090935.

Junji Yoshida et al: "2013 The Japan Society of Mechanical Engineers Contribution Analysis for Vehicle Interior Noise Using Only Response Signals", Apr. 25, 2013, XP055089844 (14 pages).

Kousuke Noumura et al: "Technical Papers Method of Transfer Path Analysis for Interior Vehicle Sound Using Principal Component Regression Method", Honda R&D Technical Review, vol. 18, No. 1, Apr. 1, 2006, XP055090910 (6 pages).

Proakis, John, et al: Digital Signal Processing (3rd ed.): Principles, Algorithms, and Applications. Prentice-Hall, Inc., Upper Saddle River, NJ, USA, 1996 (1033 pages).

International Search Report, PCT/EP2014/059785, dated Aug. 5, 2014 (3 pages).

Written Opinion of the International Searching Authority, PCT/EP2014/059785, dated Aug. 5, 2014 (8 pages).

The State Intellectual Property Office of the People's Republic of China, Search Report in corresponding Chinese Patent Application No. 2014800463001, dated Nov. 23, 2017 (3 pages).

\* cited by examiner

METHOD OF DETERMINING NOISE SOUND CONTRIBUTIONS OF NOISE SOURCES OF A MOTORIZED VEHICLE

CROSS-REFERENCE TO RELATED APPLICATIONS

This application is a U.S. National Stage of International Application No. PCT/EP2014/059785, filed May 13, 2014, which claims the benefit of European Patent Application No. 13173224.0, filed Jun. 21, 2013, both of which are incorporated herein by reference in their entireties.

The present invention relates to a method and an acoustic measurement system for determining individual noise sound contributions of a plurality of physical noise sources of a motorized vehicle at a target or reference location. The method comprises steps of placing a plurality of reference microphones at respective reference positions adjacent to respective ones of the physical noise sources, placing a measurement microphone at the target location, recording a plurality of noise sound signals and recording a target noise signal. The plurality of noise sound signals are adaptively separated using blind source separation to produce a plurality of mutually independent noise sound signals representing respective estimated noise sound signals of the plurality of physical noise sources. Each of the mutually independent noise sound signals is correlated with the recorded target noise signal to determine time domain or frequency domain characteristics of a plurality of linear transfer path filters representing respective transfer functions between the plurality of independent noise sound signals and the measurement microphone at the target location. At least one of the independent noise sound signals, representing one of the physical noise sources, may be applied to the corresponding linear transfer path filter to generate at least one target noise signal component representing the individual noise sound contribution of the physical noise source at the target location.

BACKGROUND OF THE INVENTION

Rapid and accurate acoustic measurement systems and methods for determination of individual noise sound contributions from a plurality of physical noise sources at a target or reference location is of great interest to various industries such as the automotive industry. These acoustic measurement systems and methods are highly useful for example to identify and eliminate sources of cabin noise at the driver's or passenger's ear position in cars, trucks, busses and other motorized vehicles. The determined noise sound contributions of particular physical noise sources such as motor, gearbox, tyres, exhaust pipe etc. can be systematically and individually attenuated, or even amplified, to reach a desired target noise sound characteristic at the target location. In other situations, these acoustic measurement systems and methods are highly useful to determine individual noise sound contributions from physical noise sources of the motorized vehicle at a target location which is external to the motorized vehicle for example in the far field. This determination is of significant interest in numerous types of applications for example to evaluate and reduce acoustic noise emissions of a broad range of motorized vehicles like aeroplanes, cars, trucks, trains, busses, lawn mowers etc. However, there typically exists many different independent noise sound sources in an operational condition of the motorized vehicle and the total noise sound pressure at the target position will be a complex mixture of contributions by many different physical noise sources along respective sound/vibration transfer paths.

In the prior art, so-called reciprocal or reverse acoustic transfer path based methodologies for determination of the sources of cabin noise at a target position have been applied. These transfer path methodologies, often designated as source-path-contribution, comprises the placement of one or several near-field indicator microphones close to each significant noise source of the motorized vehicle for recording of microphone signals during operation of the motorized vehicle. Thereafter, acoustic transfer functions are measured between an assumed source position or positions of each noise source and all the mounted indicator microphones at the other noise sources. By combining operating and transfer function data it is possible to at least partially eliminate the spill-over or cross-talk contributions from other noise sources to the microphone signal(s) measured at any given noise source. The separation of the different noise sources is the first step in this approach and the next step is to propagate each noise source to the target location e.g. at a certain point inside the motorized vehicle, to assess the contribution form the noise source. This known methodology is prone in its ability to accurately separate the different noise sources because a number of simplifying assumptions are made. One of these simplifying assumptions is that each noise source is modelled by a single point source or possibly by a set of assumed point sources. However, real noise sound sources often possess a distributed character due to source dimensions like an engine or exhaust system. This makes it difficult to find representative positions of the indicator microphones. Experience also shows that the measured noise contributions are quite sensitive to the exact positioning of the indicator microphones around a distributed noise source. Hence, the point source assumption can lead to significant errors in the measured transfer functions and the estimated noise source contributions at the target location. Another problem associated with these source-path-contribution methodologies is that data must be acquired during an operational condition of the motorized vehicle and transfer function measurements must be made during a stationary condition of the motorized vehicle. This is a time consuming process which is further worsened by the fact that practical volume velocity sources for the transfer function measurements are unable to cover the entire frequency range of interest such as between 20 Hz and 15 kHz. Furthermore, practical volume velocity sources may have dimensions that make these impractical or impossible to arrange at certain ones of the assumed source positions.

An alternative methodology for determination of individual noise sound contributions in automotive applications is the so-called masking method. According to the latter masking methodology, individual or several noise sources are masked or insulted using heavy material such as lead, or extra mufflers for intake and exhaust outlet to eliminate noise sound contributions from these noise sources while measuring noise sound contribution of the target noise source. As such the contribution of each of the unmasked noise source can be assessed in theory. However, this methodology gives very crude results and is overall impractical to assess the multitude of separate noise sources present in a complex vehicle construction like a car, truck or bus etc. The Internoise paper by Jakob Putner ET AL: "Operational transfer path analysis predicting contributions to the vehicle interior noise for different excitations from the same sound source", InterNoise 2012, 22 Aug. 2012 (2012-08-22), XP055090134, New York, USA discloses a method of determining individual noise sound contributions from various physical noise sources such as engine, gearbox and exhaust, at a reference position inside a vehicle cabin. The noise source contributions are measured at different operating conditions of the vehicle. The measurement methodology is referred to as Operational Transfer Path analysis (OTPA). A linearized transfer function between a selected noise source and a selected reference position is calculated.

The technical paper by Junji Yoshida ET AL "2013 The Japan Society of Mechanical Engineers Contribution Analysis for Vehicle Interior Noise Using Only Response Signals", 25 Apr. 2013 (2813-04-25), XP055889844 discloses a method of determining noise sound contributions from individual noise sources, such as engine and wind noise, to a mixed response signal (target signal) measured inside the interior of a vehicle. The proposed methodology utilizes only the mixed response signals and not any individual recordings of the noise source signals. Frequency domain ICA is applied to the mixed response signal to separate the contributions from the individual noise sources.

SUMMARY OF THE INVENTION

A first aspect of the invention relates to a method of determining individual noise sound contributions of a plurality of physical noise sources of a motorized vehicle at a target or reference location, comprising steps of:

a) placing a plurality of reference microphones at respective reference positions adjacent to respective ones of the physical noise sources, b) placing a measurement microphone at the target location, c) actuating the motorized vehicle to obtain a predetermined operating condition, d) receiving and recording a plurality of noise sound signals generated by the plurality of reference microphones, e) receiving and recording a target noise signal generated by the measurement microphone at the target location, f) adaptively separating the plurality of noise sound signals using blind source separation to produce a plurality of mutually independent noise sound signals representing respective estimated noise sound signals of the plurality of physical noise sources, g) correlating each of the mutually independent noise sound signals with the recorded target noise signal to determine time domain or frequency domain characteristics of a plurality of linear transfer path filters representing respective transfer functions between the plurality of independent noise sound signals and the measurement microphone at the target location, h) applying at least one of the independent noise sound signals, representing one of the physical noise sources, to the corresponding linear transfer path filter to generate at least one target noise signal component representing the individual noise sound contribution of the physical noise source at the target location.

The skilled person will understand that the present methodology is applicable to a diverse range of motorized vehicles such as cars, trucks, vans, busses, train, aeroplanes, lawn mowers etc. where it is of interest to identify individual noise sound contributions from the physical noise sources of the vehicle. For some vehicle categories it may be of interest to determine the individual noise sound contributions both at location or positions inside the motorized vehicle, for example in a passenger cabin, and outside the vehicle for example at a certain standardized location. In these contexts, the target location inside the vehicle may comprise an ear level position of a driver or passenger of the vehicle while target location outside the vehicle may comprise a predetermined location according to ISO 362-2:2009 for measuring noise emitted by road vehicles. In both of these contexts, it is of great significance to measure and evaluate the respective noise sound contributions of the physical noise sources of the motorized vehicle for example to reduce annoyance and fatigue from cabin noise or to reduce the level of exterior noise emission from the bypassing vehicle.

For interior vehicle target location(s), the target location of the measurement microphone may be at an ear drum position of a human head and torso simulator (manikin) arranged at a predetermined position inside the cabin of the motorized vehicle. The human head and torso simulator may for example be placed at a driver's seat or a passenger's seat of the motorized vehicle during recording of the target noise signal at the target location. A diaphragm of the measurement microphone is preferably arranged at an ear drum plane of an ear simulator mounted in the human head and torso simulator. These embodiments incorporate human body and outer ear related sound reception/propagation features of the acoustic transmission path from the physical noise source to the target location.

The nature and number of physical noise sources of the motorized vehicle will depend on the type of vehicle. For a car, the physical noise sources normally comprise components like the engine, air intake, exhaust pipe, front and rear tires, gearbox etc. The number of reference microphones will accordingly also vary depending on the number and dimensions of physical noise sources of the particular motorized vehicle. For typical car measurements, the number of reference microphones is often between 2 and 20.

The reference microphone is preferably placed within a distance between 1 cm and 10 cm away from the outer surface of the adjacent physical noise source because this range will minimize cross-talk noise from adjacent physical noise sources and still keep a safety distance to the physical noise source. Each of the reference microphones and the measurement microphone preferably comprises a reference microphone having a well-defined acoustic sensitivity and frequency response in accordance with an individual calibration chart. This type of reference microphones are available from several manufacturers together with calibration charts and other electroacoustic data documenting acoustic parameters of the individual reference microphone and its sensitivity to changes in environmental conditions such as atmospheric pressure, temperature and humidity. The reference microphone may comprise one or more standardized outer dimension(s) mating to a coupling member of a sound calibrator or pistonphone such that the microphone sensitivity can be accurately calibrated at one or more reference frequencies via a specific type of calibrator. In one exemplary embodiment, the reference microphone comprises a ½-inch pressure-field microphone type 4192 available from the manufacturer Brüel & Kjær Sound and Vibration Measurement A/S. Generally, standard measurement microphones designed for high sound pressure level handling may be used as reference microphones for making the operational vehicle measurements. For certain types of physical noise sources such as intakes of cars it may be advantageous to use a surface mount microphone mounted inside the intake duct.

The preferred number of reference microphones for a particular measurement set-up will vary depending on application specific factors such as dimensions and complexity, in particular the number of distinct physical noise sources, of the motorized vehicle. In a number of useful measurement set-ups the number of reference microphones is between 2 and 64. For typical automotive measurement set-ups and measurement procedures, the number of reference microphones is between 10 and 20.

The step of applying at least one of the independent noise sound signals to the corresponding linear transfer path filter leads to the generation of at least one target noise signal component representing the individual noise sound contribution of the physical noise source at the target location. This feature is particularly helpful by providing a mechanism for evaluation or assessment of the subjective and/or objective impact of the noise sound contribution of a particular physical noise source at the target location. Alternatively stated, the feature allows a listener, e.g. a car design engineer, to selectively reproduce and listen to a particular physical noise source at the target location without any interference from any of the nearby physical noise sources. The independent, and therefore also uncorrelated, nature of the computed plurality of independent noise sound signals allows each of these to be correlated with the target noise signal recorded at the target location to find the individual or separated contribution of a particular independent noise sound signal to the target noise signal.

The at least one target noise signal(s) may be reproduced in various ways for assessment for example through a suitable audio rendering application executed on the measurement computer communicating with a suitable audio port or device of the measurement computer. A loudspeaker, headphone or earphone etc. may be coupled to the audio port to acoustically transmit the target noise signal(s) to the listener's ear or ears. The skilled person will appreciate that the one or more target noise signal(s) may be evaluated by the listener(s) through informal or formal listening sessions. A formal listening session may include steps of listening to and evaluating a perceptual dimension/metric of the one or more target noise signal(s) on a single or several perceptually relevant dimensions such as a one or more of: {loudness, sharpness, roughness, fluctuation strength}.

In the alternative, or in addition, the one or more target noise signal(s) may evaluated or measured by a sound quality assessment program or application executed on the measurement computer using a predetermined psychoacoustic model of human hearing.

The skilled person will appreciate that the plurality of noise sound signals and the target noise signal preferably are digitally sampled either by respective analog-to-digital converters arranged in or at the reference microphones and measurement microphone. The sampling frequency of each of the plurality of noise sound signals and the target noise signal is preferably between 5 kHz and 48 kHz such about 32 k kHz depending on the particular application. The plurality of noise sound signals and the target noise signal(s) are preferably synchronously sampled and recorded to provide a common time base for all noise signals.

The skilled person will understand that several target locations with respective measurement microphones may be utilized in the present acoustic measurement system measurement and during execution of present measurement methodology. One embodiment of the present acoustic measurement system may for example include a plurality of target locations arranged at relevant driver and passenger positions inside the car cabin. In other embodiments, one target location may be arranged inside the car cabin while one or more additional target locations are arranged outside the car cabin such that simultaneous interior and exterior noise recordings and assessment can be made.

The skilled person will understand that a large number of different blind source separation schemes or algorithms may be applied in the present invention to provide the desired separation of convolutive mixtures in the recorded noise sound signals. The blind source separation scheme or algorithm is preferably based on independent component analysis which the applicant has proved to be a powerful tool in automotive and related blind source separation problems. A particular advantageous set of embodiments of the independent component analysis use a linear prediction approach to reduce the convolutive independent component analysis problem associated with the mixture of the plurality of recorded noise sound signals to an instantaneous independent component analysis problem as described below in additional detail in connection with the appended drawings. According to one of these embodiments, the plurality of recorded noise sound signals is spatially and temporally de-correlated to provide a plurality of de-correlated or whitened noise sound signals. Subsequently, instantaneous independent component analysis is applied to the de-correlated or whitened noise sound signals to produce the plurality of mutually independent noise sound signals. These steps may of course by executed by a suitable application program executed on a microprocessor or Digital Signal Processor of the previously discussed measurement computer. The instantaneous independent component analysis may be based on an appropriate type of standard algorithm for the purpose such as JADE.

In the alternative, the blind source separation may be based on auto-regressive modelling and comprise steps of:

applying multivariate auto-regressive modelling of the plurality noise sound signals by a set of AR filters to obtain a plurality of de-correlated or whitened noise sound signals, applying instantaneous independent component analysis to the de-correlated or whitened noise sound signals to produce the plurality of mutually independent noise sound signals.

The present methodology preferably comprises a step of associating each of the plurality of independent noise sound signals with a label or attribute indicating its corresponding physical noise source. Each of the labels will typically comprise a short indication of the type or nature of physical noise source such as "intake", "front tire", "exhaust pipe" etc. The proper label of each of the plurality of recorded noise sound signals may be initially determined based on known positions of the reference microphones at the respective physical noise sources such as air intake, engine, front tyre etc. The proper label of each of the plurality of independent noise sound signals may be determined in several ways. According to a first embodiment, the labelling of the independent noise sound signals is determined based on the relative contribution a particular independent noise sound signal makes to the recorded noise sound signals. This first embodiment is based on correlation analysis and preferably comprises steps of:

correlating each of the mutually independent noise sound signals with the plurality of recorded noise sound signals generated by the plurality of reference microphones to determine time domain or frequency domain characteristics of a plurality of linear mixing filters representing respective transfer functions between each independent noise sound signal and the plurality of recorded noise sound signals,     applying each of the independent noise sound signals to the plurality of linear mixing filters to compute respective noise sound contributions to each of the plurality of recorded noise sound signals, determining the label or attribute of each of the independent noise sound signals based on the computed noise sound contributions to the plurality of recorded noise sound signals.

In this first embodiment of the label assignment or determination methodology, the plurality of computed independent noise sound signals can be viewed as inputs to the plurality of linear mixing filters or mixing filter matrix while the plurality of recorded noise sound signals as respective outputs of the mixing filter matrix. Thereby, the noise sound contribution from each of the independent noise sound signals to any of the recorded noise sound signals can be determined in a straight forward manner. Anyone of the plurality of independent noise sound signal may be selected and applied to the mixing filter matrix and the noise sound contribution for this independent noise sound signal to each of the plurality of recorded noise sound signals determined. The contribution may be determined based on signal power in a certain frequency range. Hence, it is possible to determine the relative distribution of the signal power of the selected independent noise sound signal between the recorded noise sound signals and identify which one of the recorded noise sound signals that possesses the highest relative signal power contribution from the selected independent noise sound signal. Following this determination, the label of the particular recorded noise sound signal that possessed the highest relative signal power from selected independent noise sound signal may be assigned to the latter independent noise sound signal. Alternatively, the independent noise sound signal may be labelled with the recorded noise sound signal(s) in which the independent noise sound signal in questions contributes with more than 50% of the signal noise power. The procedures for determining the mixing filter matrix and practical examples of the labelling procedure are discussed in additional detail below in connection with the appended drawings According to a second embodiment of the label assignment or determination step, the appropriate label of each of the independent noise sound signals is determined based on spatial localization of each of the computed independent noise sound signals. According to this embodiment, the method of determining individual noise sound contributions of a plurality of physical noise sources comprises steps of:
assigning a label to each of the plurality of recorded noise sound signals based on the reference position of the reference microphone,
correlating each of the mutually independent noise sound signals with the plurality of recorded noise sound signals generated by the plurality of reference microphones to determine time domain or frequency domain characteristics of a plurality of linear mixing filters representing respective transfer functions between each independent noise sound signal and the plurality of recorded noise sound signals,
determining respective phase differences between each of the mutually independent noise sound signals and the plurality of recorded noise sound signals from the time domain or frequency domain characteristics of the plurality of linear mixing filters,
for each of the independent noise sound signals determining based on the respective determined phase differences the recorded noise sound signal with the shortest distance to the noise sound signal,
assigning to each of the independent noise sound signals, the label of the recorded noise sound signal with the shortest distance.

The skilled person will appreciate that the shortest distance to each of the independent noise sound signals may be determined directly from inspection of the respective phase differences of the plurality of recorded noise sound signals. In this case, each of the plurality of phase differences is preferably determined at the same reference frequency, such as 100 Hz, 1 kHz or 3 kHz, within the measurement frequency range.

In the alternative, each of the plurality of phase differences may be converted into corresponding distance in which case the phase differences may have been determined either at the same reference frequency or at different reference frequencies.

Hence, the method of determining individual noise sound contributions of a plurality of physical noise sources may comprise further steps of:
converting the determined plurality of phase differences to a plurality of corresponding distances between each of mutually independent noise sound signals and the plurality of recorded noise sound signals. Using distances rather than phase differences may be preferred because distances have a direct physical meaning and tend to simply the determination of the recorded noise sound signal with the shortest distance to the noise sound signal in question.

According to yet another preferred embodiment of the invention, the linear transfer path filters are exploited to check or verify that the sum of the individual noise sound components, generated by filtering the plurality of independent noise sound signals through the linear transfer path filters, accounts for the entire signal power in the recorded target noise sound signal. This embodiment comprises further steps of:
applying the plurality of independent noise sound signals to the respective linear transfer path filters to generate corresponding individual noise sound components of the recorded target noise signal,
determining a combined signal level, such as signal power, energy or amplitude, of the individual noise sound components,
comparing the combined signal level of the individual noise sound components with a corresponding signal level of the corresponding recorded target noise signal.

If the summed signal level of the individual noise sound components is unable to account for substantially the entire signal level of the recorded target noise sound signal, this level deviation indicates that the recorded target noise sound signal contains noise sound components that are unaccounted for. Hence, a significant deviation indicates that noise sound contribution(s) from a significant physical noise source is unrepresented in the determined independent noise sound signals. This type of consistency check or validation is very helpful for a test operator or technicians because a negative validation outcome points the operator's attention to missing physical noise sources in the set-up of the acoustic measurement system. Hence, the operator will be able to reposition one or more of the reference microphones and/or add further reference microphones to the measurement set-up to capture the noise sound contribution of the missing physical noise sound source.

A second aspect of the invention relates to an acoustic measurement system for determining individual noise sound contributions of a plurality of physical noise sources of a motorized vehicle at a target or reference location. The acoustic measurement system comprising:

a plurality of reference microphones positionable at reference positions adjacent to respective ones of the physical noise sources, a measurement microphone positionable at the target location, a computerized measurement device comprising:

a plurality of microphone signal inputs and connectors connected to the plurality of reference microphones and the measurement microphone for receipt of a plurality noise sound signals generated by the plurality of reference microphones and a target noise signal generated by the measurement microphone, a signal recording device for storage of the plurality noise sound signals in digital format and the target noise signal in digital format, a user readable display for displaying various recorded signals and user interface variables, a programmable processor configured to, in accordance with a set of executable program instructions, perform steps of a1) adaptively separating the plurality of recorded noise sound signals using blind source separation to produce a plurality of mutually independent noise sound signals each representing an estimated noise sound signal of one of the physical noise sources, b1) correlating each of the mutually independent noise sound signals with the recorded target noise signal to determine time domain or frequency domain characteristics of a plurality of linear transfer path filters representing respective transfer functions between the plurality of independent noise sound signals and the measurement microphone at the target location, c1) applying at least one of the independent noise sound signals, representing one of the physical noise sources, to the corresponding linear transfer path filter to generate at least one target noise signal component representing the individual noise sound contribution of the physical noise source at the target location.

The acoustic measurement system may comprise a properly adapted or programmed version of the PULSE measurement platform which is designed for sound and vibration measurement and available from the present applicant/assignee in a plurality of configurations. The PULSE measurement platform may be executed on a personal computer running a suitable operating system such as Windows. The acoustic measurement system may comprise an electronics assembly with a plurality of data acquisition channels each comprising various signal conditioning circuitry for the reference and measurement microphones. This signal conditioning circuitry may comprise a microphone preamplifier and/or a bias voltage generator and/or an A/D converter, operatively coupled to the microphones for generation of the noise sound signals and target signal in a digital format as discussed above for example a standardized digital audio format. The skilled person will appreciate that various other computing steps of the methodologies described above may be implemented as respective software applications or routines executed on the software programmable processor, e.g. a microprocessor and/or a Digital Signal Processor, of the computerized measurement device. Each of the software applications or routines may comprise a set of executable program instructions configured to carry out the particular step or steps of the methodology in question.

The acoustic measurement system preferably comprises a display with a graphical user interface (GUI) that is configured to present one or more recorded or processed signals, such as anyone of the recorded target noise signal or signals, the plurality of recorded noise sound signals, the independent noise sound signals, the target noise signal components etc., to the user through suitable data graphs.

The processor of the computerized measurement device is preferably further configured to:

d) retrieve the at least one stored target noise signal component from the signal recording device and reproducing the at least one stored target noise signal component through an audio output port accessible to the computerized measurement device.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
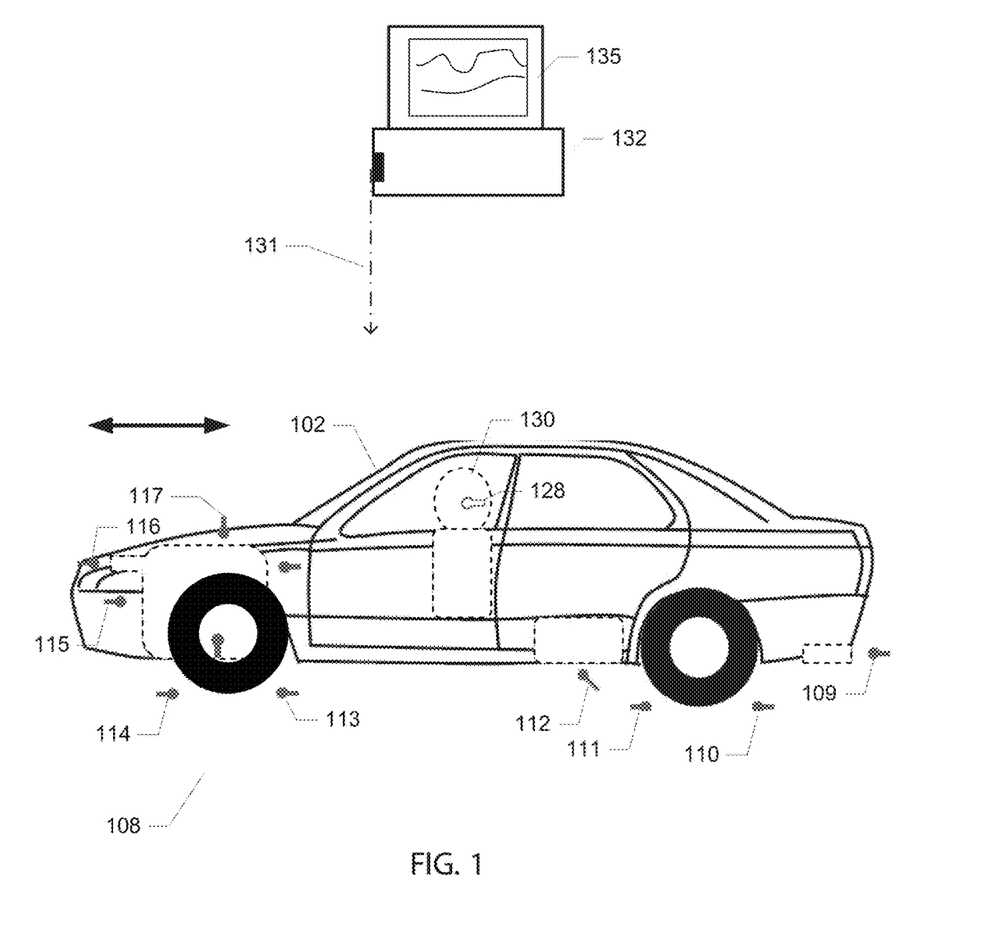
FIG. 1 is a simplified schematic drawing of an acoustic measurement system mounted on a car under test for determining individual noise sound contributions at the drivers ear level position of a plurality of physical noise sources of the car in accordance with a first embodiment of the invention.

FIG. 1 is a simplified schematic drawing of an acoustic measurement system coupled to a car 102 under test for determining individual noise sound contributions of a plurality of physical noise sources of the car 102 at the driver's ear level position in accordance with a first embodiment of the invention. The acoustic measurement system comprises a plurality of reference microphones 109-117 placed adjacent to, or at least nearby, each of the physical noise sources. The acoustic measurement system additional comprises a measurement computer 132 with a software programmable microprocessor. The acoustic measurement system may comprise a properly adapted or programmed version of the PULSE measurement platform which is designed for sound and vibration measurements and signal analysis. The PULSE platform is available from the present applicant/assignee in a plurality of configurations. The measurement computer 132 is connected via a suitable communication link 131 to the plurality of reference microphones 109-117 and to a measurement microphone 128. The measurement computer 132 also includes a display with a graphical user interface (GUI) that is configured to present various recorded or processed microphone signals in data graphs to the user. The GUI may additionally include various operating buttons and commands allowing the user to control data acquisition and presentations functions of the acoustic measurement system.

The skilled person will appreciate that the communication link 131 may reside within a multi-channel data acquisition system and be configured to transfer microphone signals in analog format or digital format for example encoded according to a standardized data communication protocol.

The target or reference position, at which it is desired to measure or assess the individual noise sound contributions, may for example be located at the measurement microphone 128 arranged at ear level position of a head and torso simulator 130 seated in the driver's seat as illustrated. The measurement microphone 128 may for example have its diaphragm situated at the ear drum plane of an ear simulator mounted in the head and torso simulator 130 to mimic outer ear related features of the acoustic transmission path to the ear drum of a human driver. In other embodiments of the invention, the target location may comprise a predetermined location outside of the car or other motorized vehicle for example a predetermined location according to ISO 362-2: 2009 for measuring noise emitted by road vehicles. In the latter context, it is of great significance to measure and evaluate the respective noise sound contributions of the physical noise sources from the bypassing car at the target location to systematically reduce or optimize the exterior noise emission of the car under normal traffic situations.

The plurality of physical noise sources are assumed to produce independent noise sound pressures under operating conditions of the car 102 and these noise sound pressures are picked up by the plurality of reference microphones 109-117 and converted into a plurality of noise sound signals which are transmitted to a suitable recording or storage device of the measurement computer 132 for storage in a suitable digital signal format, e.g. 16 bit PCM. Simultaneously, a target noise signal is picked up at the measurement microphone 128 and transmitted to the recording or storage device of the measurement computer 132 for storage in the selected digital format. The storage device may for example comprise a magnetic or optical disc drive or solid state memory etc. Hence, the plurality of noise sound signals are supplied by the reference microphones in response to the respective received noise sound pressures and the target noise signal is supplied in response to the noise sound pressure at the driver's ear drum position. The skilled person will appreciate that the plurality of noise sound signals and the target noise signal preferably are synchronously recorded to provide a common time base for all noise signals.

The noise sound pressure picked up by any specific reference microphone is likely to contain a mixture of several different physical noise sources due the largely unavoidable cross-talk between adjacent or nearby noise sources. The reference microphone 116 is for example placed adjacently to the air intake of the engine 125, which represents a distinct physical noise source, to measure the noise sound pressure generated by the air intake. However, noise sound pressures generated by various rotating components of the nearby engine 125 are also leaking into the reference microphone 116 such that the picked up noise sound pressure includes noise contributions from the engine. The skilled person will appreciate that corresponding cross-talk mechanisms exist between the respective noise sound pressures picked up by the reference microphones 117 and 115, which are aimed at measuring various engine noise sources, and the noise sound pressure generated by the air intake. Furthermore, the highly complex acoustic pathways between the various physical noise sources of the car and each of the reference microphones 109-117 will generally lead to noise sound signals that each contains a highly complex mixture of noise sound contributions from the multitude of different physical noise sources. The physical noise sources of the car under typical operating conditions include, in additions to the already discussed engine and air intake, components like an exhaust pipe, front and rear tires, a gearbox etc.

The present embodiment of the methodology for determining individual noise sound contributions of the plurality of physical noise sources of the car 102 preferably proceeds with the steps of initially placing the plurality of reference microphones 109-117 at respective reference positions adjacent to the respective ones of the previously discussed physical noise sources of the car such as the engine, front and rear tires, exhaust pipe outlet, gearbox etc. Furthermore, the diaphragm of the previously discussed measurement microphone 128 is placed at the ear drum position of the head and torso simulator. Thereafter, the car 102 is actuated or driven according to a predetermined operating condition for example driving at constant speed in a specified gear or accelerating through gears following a certain predetermined scheme. During driving, the car 102 may be positioned on a rolling road, chassis dynamometer or scroller to keep it stationary or the car 102 may drive on a designated test track with the measurement computer 132 carried inside the car cabin while recording the plurality of noise sound signals and target signal on the storage device. The latter procedure obviously requires the plurality of reference microphones 109-117 to be appropriately fastened to the relevant mechanical components of the car. The plurality of recorded noise sound signals are adaptively separated using blind source separation to produce a plurality of mutually independent noise sound signals representing respective estimated noise sound signals of the plurality of physical noise sources. This adaptive separation is preferably carried out by a suitable application program executed on the measurement computer 132 as described in additional details below.

Figure 2:
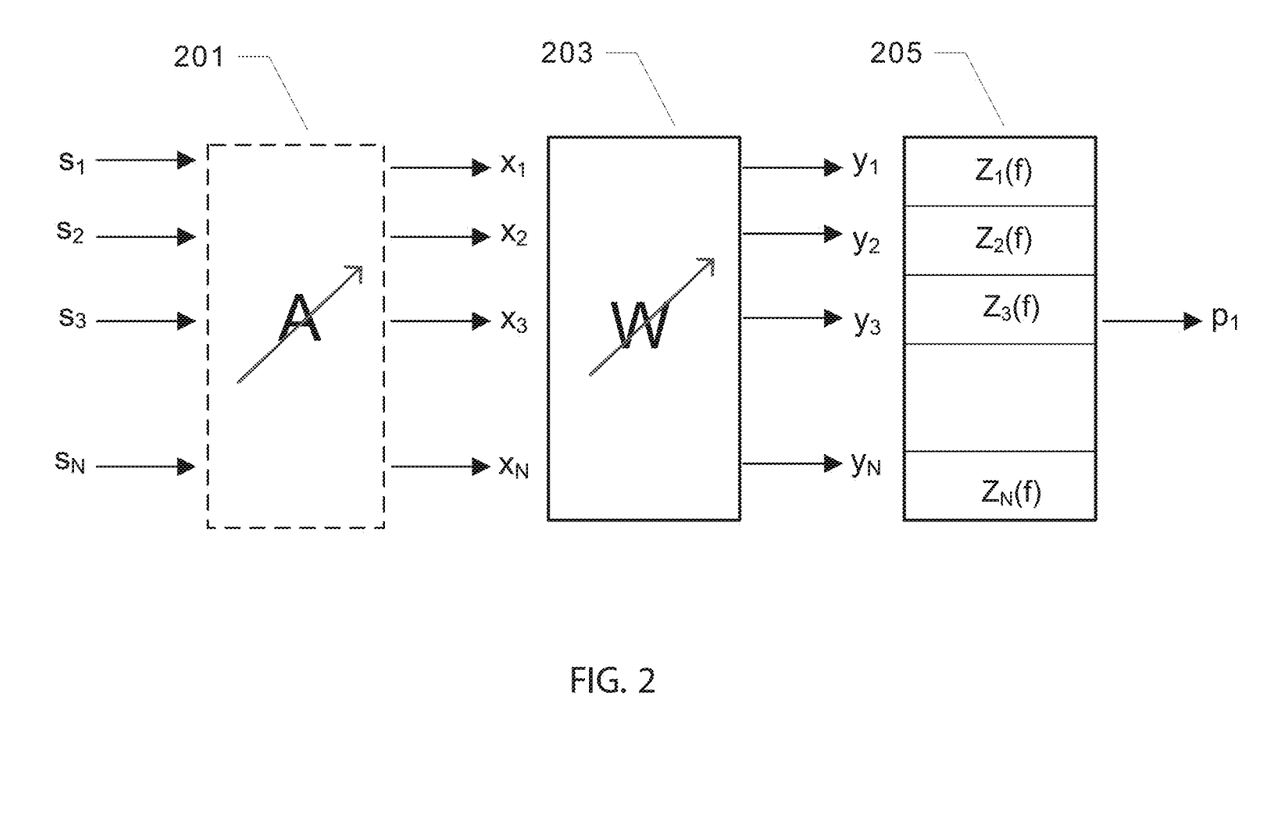
FIG. 2 is a schematic diagram conceptually illustrating the signal processing steps leading to the determination of individual noise sound contributions of a plurality of physical noise sources of a motorized vehicle at a target location using blind source separation in accordance with the first embodiment of the invention.

FIG. 2 is a schematic diagram illustrating the signal processing steps leading to the determination of the individual noise sound contributions of the plurality of physical noise sources recorded during operating conditions of the car depicted on FIG. 1 at the driver's ear drum position where the target microphone is situated. The plurality of recorded noise sound signals are schematically represented by signals $x_1$-$x_N$ which are input to a matrix of unmixing filters W 203. The task of the blind source separation is to determine the plurality of mutually independent noise sound signals, schematically indicated as $y_1$-$y_N$, that represent the estimated noise sound signals of the plurality of physical noise sources. Conceptually, the 'true' noise sound signals emitted by the noise sound sources are illustrated on FIG. 2 as signals $s_1$-$s_N$. These 'true' noise sound signals are noise signals without the previously discussed cross-talk noise contributions of the adjacent or nearby physical noise sources. Hence, the measured and recorded noise sound signals $x_1$-$x_N$ can be viewed as being produced by these 'true' noise sound signals $s_1$-$s_N$ subjected to a (highly complex) linear matrix 201 of mixing filters A. The nature of the previously discussed cross-talk noise contributions has the effect that the recorded noise sound signals $x_1$-$x_N$ form convolutive mixtures of the 'true' (un-measurable) noise sound signals $s_1$-$s_N$.

Generally speaking a large number of different blind source separation schemes or algorithms may be applied in the present invention to provide the desired separation of the convolutive mixtures in the recorded noise sound signals $x_1$-$x_N$. The selected blind source separation (BSS) scheme or algorithm is preferably based on independent component analysis (ICA) which the applicant has proved to be a powerful tool in automotive BSS problems. A particular advantageous set of embodiments of ICA use a linear prediction approach to reduce the above-mentioned convolutive ICA problem associated with the mixture of the recorded noise sound signals $x_1$-$x_N$ to an instantaneous ICA problem after certain pre-processing steps following the solution proposed in [1]. According to one of these embodiments, the recorded noise sound signals $x_1$-$x_N$ are initially spatially and temporally de-correlated by the application program, schematically illustrated by computing block 203, executed on the measurement computer 132 to provide a plurality of de-correlated or whitened noise sound signals. The linear prediction approach leading to the whitening of the recorded noise sound signals $x_1$-$x_N$ relies only on second order statistics of these signals. Thereafter, instantaneous independent component analysis is applied to the de-correlated or whitened noise sound signals using an appropriate type of standard algorithm for the purpose such as to JADE produce the plurality of mutually independent noise sound signals $y_1$-$y_N$ at the output of the computing block 203. The independent, and therefore also uncorrelated, nature of the computed noise sound signals $y_1$-$y_N$ allows now each of these to be correlated with the recorded noise sound signal at the target location to find its individual or separated contribution.

The next step of the application program is schematically illustrated by computing block 205. In this next step, the application program performs correlation analysis between each of the mutually independent noise sound signals $y_1$-$y_N$ and the recorded target noise signal recorded at the ear drum of the manikin in this specific embodiment. The correlation analysis results in a set of linear transfer path filters $Z_1$ (f)-$Z_N$ (f) describing time domain characteristics of respective linear transfer paths between the independent noise sound signals and the measurement microphone at the ear drum position of the manikin, i.e. the target location, for each of the independent noise sound signals. This computation of the linear transfer path filters $Z_1$ (f)-$Z_N$ (f) allows each of the independent noise sound signals $y_1$-$y_N$ to be applied to the corresponding linear transfer path filter and in response generate a target noise signal component representing the individual noise sound contribution at the target location of the physical noise source modelled by the noise sound signal in question.

The skilled person will appreciate that this property is highly useful for numerous types of objective and/or subjective assessments and evaluations of individual noise sound contributions made by the physical noise sources. The noise sound signal $y_1$ at the uppermost output of the output of computing block 203 may for example model the true noise sound signal generated by the engine air intake at a certain operating condition of the car. However, in order to assess the noise contribution of this particular physical noise source at the driver's ear, the independent noise sound signal $y_1$ is filtered by the linear transfer path filter $Z_1$ (f), which represents the combined often complex sound propagation path, possibly involving both air borne and structural borne sound components, from the air intake to the driver's ear as modelled by the previously discussed placement of the measurement microphone in the manikin. The filtering of the independent noise sound signal $y_1$ by the linear transfer path filter $Z_1$ (f) generates a first target noise signal component of the recorded target noise signal $p_1$. In a similar manner each of the residual independent noise sound signals $y_2$-$y_N$ can be filtered through its linear transfer path filter $Z_2$ (f)-$Z_N$ (f) to produce the individual target noise signal components or contributions to the recorded target noise signal $p_1$ of each of the residual physical noise sources.

The correlation analysis between each of the mutually independent noise sound signals $y_1$-$y_N$ and the recorded target noise signal $p_1$ is preferably carried out by Wiener filtering. Shortly stated Wiener filtering estimates a linear filter which minimizes a mean square error between each of the unmixed independent noise sound signals, e.g. $y_1$ and the cross-talk infected target noise signal. The signal component(s) of the target noise signal which is uncorrelated with the independent noise sound signal in question, $y_1$ in this example, is averaged out or eliminated. The elimination has the further beneficial effect that the estimation of the linear filters $Z_1$ (f)-$Z_N$ (f) is unaffected by external uncorrelated noise signals for example noise signals picked up by the measurement microphone at the target location. In this context the external uncorrelated noise signals are noise sounds generated by other physical noise sources than those of the motorized vehicle itself.

The Wiener filtering leads to time domain representations of the linear transfer path filters $Z_1$ (f)-$Z_N$ (f) for the independent noise sound signals. A given linear transfer path filter can be directly applied to the corresponding independent noise sound signal to produce the target noise signal component in question. Hence, one or more of the target noise signal components(s) of the recorded noise sound signal $p_1$ may be reproduced through a suitable audio rendering application and a suitable audio port or device coupled to the measurement computer 132. A loudspeaker, headphone or earphone etc. may be coupled to the audio port to acoustically reproduce the target noise signal component in question to the listener's ear or ears. The skilled person will appreciate that the one or more target noise signal component(s) may be evaluated by the listener(s) through informal or formal listening sessions. A formal listening session may include steps of listening to and evaluating a perceptual dimension/metric of the one or more target noise signal component(s) on a single or several perceptually relevant dimension(s) such as a one or more of: {loudness, sharpness, roughness, fluctuation strength}. In the alternative, or additionally, the one or more target noise signal component(s) may be evaluated or measured by a sound quality assessment program using a predetermined psychoacoustic model of human hearing.

The psychoacoustic model may be implemented as an application program executing on the measurement computer 132. The skilled person will appreciate that these formal listening sessions or computerized evaluation of the sound quality of the one or more target noise signal component (s) may be helpful to car designers or engineers to rapidly identify physical sources responsible for annoying noise sound contributions for the purpose of attenuating or eliminating these. Likewise, it is also beneficial to allow the car designers or engineers to rapidly track the physical noise sources of "pleasant" target noise signal contributions, e.g. certain exhaust or engine sound pictures in a sports car, such that these can be tuned or amplified at the target location.

The linear filters $Z_1$ (f)-$Z_N$ (f) can also be exploited in another highly advantageous manner to verify that the sum of the individual noise sound components, generated by filtering the independent noise sound signals $y_1$-$y_N$ through the linear filters $Z_1$ (f)-$Z_N$ (f), accounts for the entire signal power in anyone of multiple recorded target noise sound signals such as $p_1$. This feature can be used to check whether the computed independent noise sound signals $y_1$-$y_N$ with reasonably accuracy is able to account for the entire noise power of the recorded target noise signal in question as described in additional detail below in connection with FIG. 6.

Figure 3:
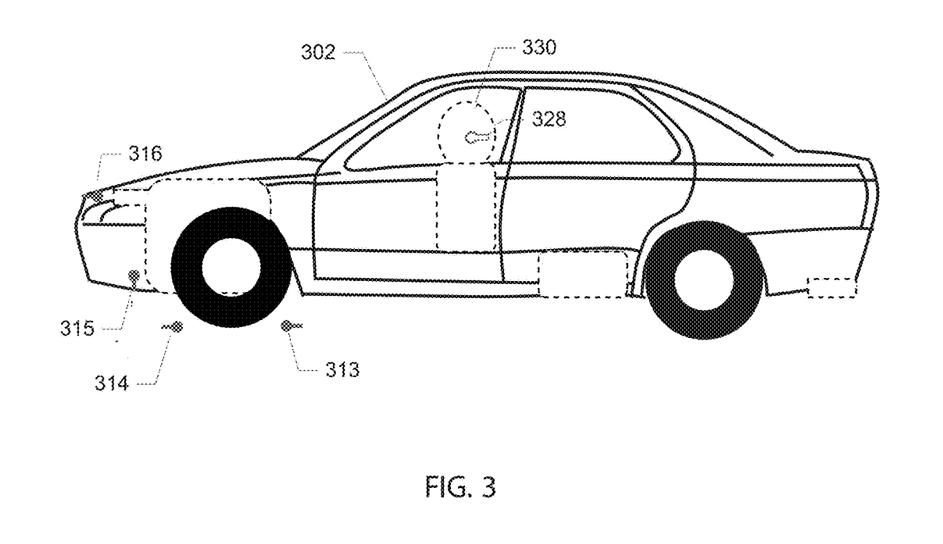
FIG. 3 is a simplified schematic drawing of the acoustic measurement system mounted on the car depicted on FIG. 1 for illustrating individual noise sound contributions and source labelling of four exemplary physical noise sources of the car.
Figure 4:
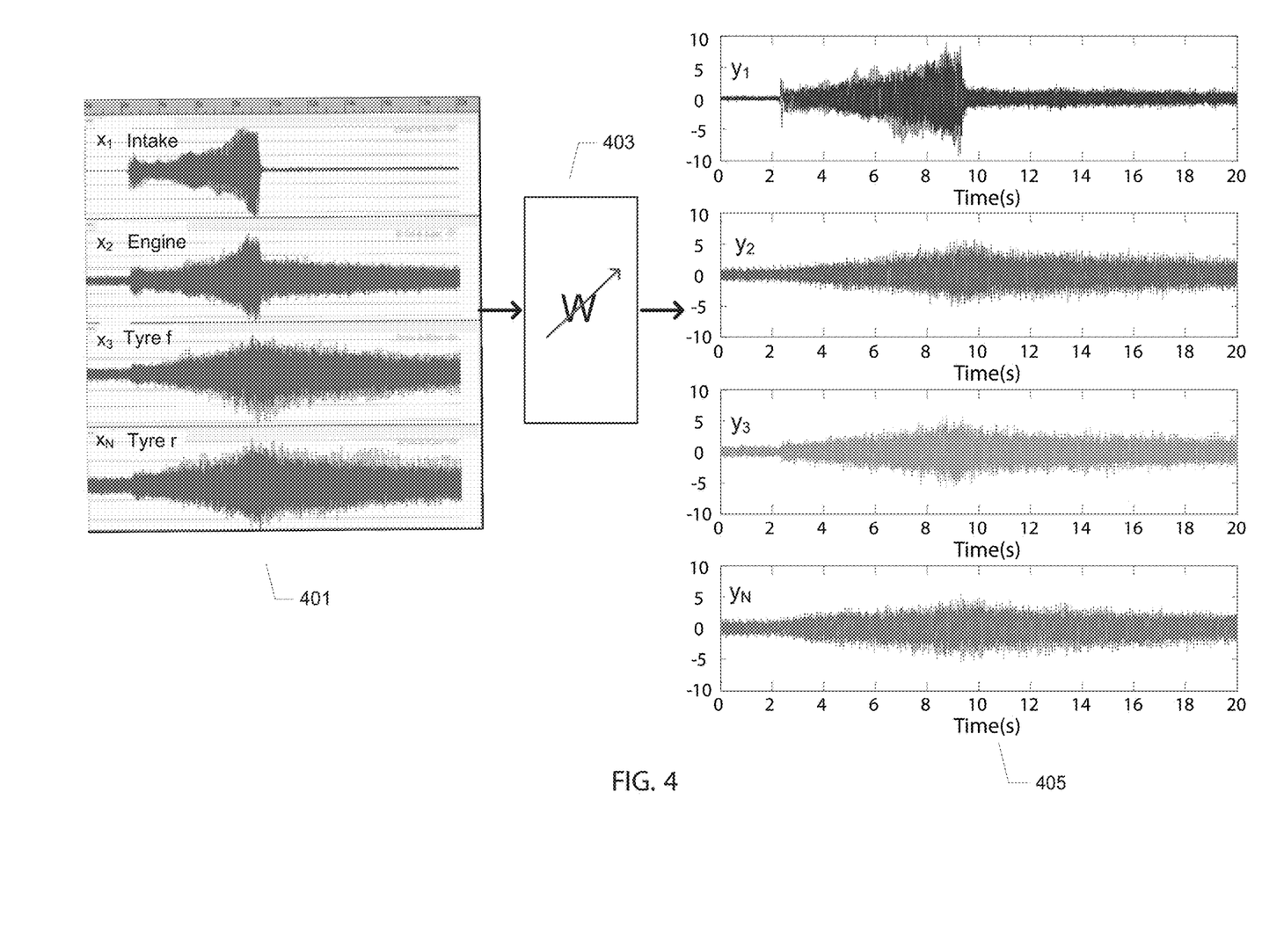
FIG. 4 shows a first set of graphs of four measured noise sound signals generated by four reference microphones arranged at the four exemplary physical noise sources and a second set of graphs of four corresponding mutually independent noise sound signals derived from the measured noise sound signals using blind source separation, FIGS. 5A) and 5B) schematically illustrate how noise source labels or attributes are associated with the four independent noise sound signals in accordance with the first embodiment of the invention, FIG. 5C) schematically illustrates an alternative methodology for determining how noise source labels or attributes are associated with the four independent noise sound signals.

FIG. 3 is a simplified schematic drawing of the previously discussed car 302 under test for determining individual noise sound contributions of four exemplary physical noise sources recorded by the respective reference microphones 313, 314, 315, 316 and how the corresponding independent noise sound signals $y_1$-$y_N$ are recognized and appropriately labelled in the above-discussed measurement system. The labelling of each of the independent noise sound signals $y_1$-$y_N$ is important to identify its origin in terms of physical noise source. The four exemplary physical noise sources are formed by the front tire rear and front tire front, engine and air intake, respectively. The skilled person will appreciate that fewer or additional physical noise sources may be selected for present purpose in any practical measurement session. FIG. 4 shows a first set of graphs 401 comprising four measured or recorded noise sound signals $x_1$-$x_4$ picked up by the reference microphones 313, 314, 315, 316 placed adjacent to their respective physical noise source. Each of the signal graphs 401 is labelled with the physical noise source of the vehicle at which the reference microphone is placed. The recorded noise sound signals $x_1$-$x_4$ are applied to the previously discussed matrix of unmixing filters W, determined according to the previously discussed two-stage blind source separation technique involving linear prediction based whitening followed by instantaneous ICA, to generate the four corresponding mutually independent noise sound signals $y_1$-$y_4$ depicted on the second set of graphs 405.

Figure 5A:
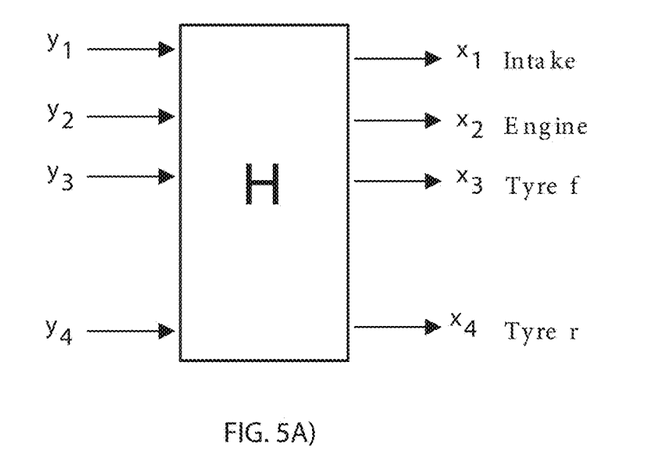

The relationship between each of the independent noise sound signals $y_1$-$y_N$ and the four recorded noise sound signals $x_1$-$x_4$ generated or picked-up by the four reference microphones at the respective physical noise sources is preferably determined using correlation analysis to determine time domain or frequency domain characteristics of a plurality of linear mixing filters or mixing filter matrix H representing respective transfer functions between each of the independent noise sound signals $y_1$-$y_N$ and the recorded noise sound signals $x_1$-$x_4$. In this context, the known independent noise sound signals $y_1$-$y_N$ can be viewed as inputs to the mixing filter matrix H and the recorded noise sound signals $x_1$-$x_4$ as respective outputs of the mixing filter matrix H as schematically illustrated on FIG. 5A). The mixing filter matrix H of the convolutive mixtures can be estimated by least-squares estimation, i.e. solving equation (1) below for $A_\tau$:

$$\langle x_t s_{t-\lambda}^T \rangle = \Sigma_\tau A_\tau \langle s_{t-\tau} s_{t-\lambda}^T \rangle \qquad (1)$$

$A_\tau$ can be solved by matrix inversion to find the mixing filter matrix H. This is a generalization of the Wiener-Hopf equations (see e.g. [2]) for estimating the coefficients of a "Wiener filter" to the multivariate case.

Once, the linear mixing filters of matrix H are computed or determined, the noise sound contributions from each of the independent noise sound signals $y_1$-$y_N$ to each of the four recorded noise sound signals $x_1$-$x_4$ can be determined in a straight forward manner. A particular independent noise sound signal for example $y_1$ may be applied to the linear mixing filters of mixing matrix H and the noise contributions from $y_1$ to each of the recorded noise sound signals $x_1$-$x_4$ determined—for example expressed in terms of signal power or energy. Hence, the relative distribution between the recorded noise sound signals $x_1$-$x_4$ of the signal power of $y_1$ is determined. Therefore, it is also possible to determine which particular recorded noise sound signal that contains the highest relative signal power contribution from $y_1$.

Figure 5B:
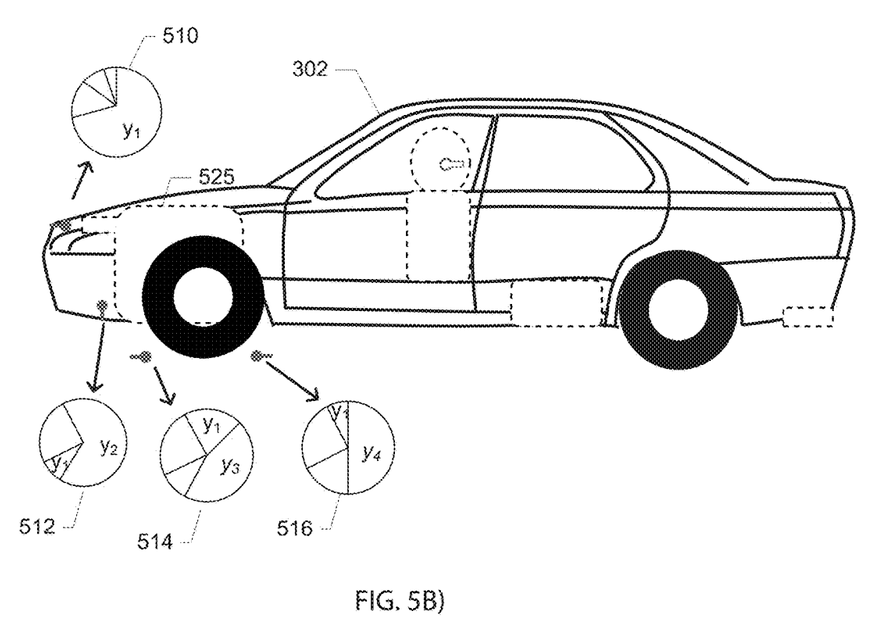

As schematically illustrated on the pie diagram 510 of FIG. 5B), the recorded noise sound signal $x_1$ recorded by the reference microphone 316 adjacent to the air intake receives approximately 70% of its total signal power from the independent noise sound signal $y_1$ while the recorded noise sound signal $x_3$ receives approximately 20% of its total signal power from $y_1$ and each of the recorded noise sound signals $x_4$ and $x_2$ receives about 5% of their total signal power from $y_1$. Hence, in the latter situation, the previously selected label of $x_1$ (indicating the adjacent physical noise source as being the air intake) may be associated with, or assigned to, the independent noise sound signal $y_1$ to label its physical noise source as the air-intake picked up by the reference microphone 316. A corresponding procedure may of course be applied to the residual independent noise sound signals $y_2$-$y_4$ resulting in appropriate labelling of all independent noise sound signals. For example, $y_2$ could reasonably be assigned with the "engine" label associated with the recorded noise sound signal $x_2$ since it is evident from the pie diagram 512 that the independent noise sound signal $y_2$ primarily origins from engine noise recorded by the reference microphone 315 (see FIG. 3).

Figure 5C:
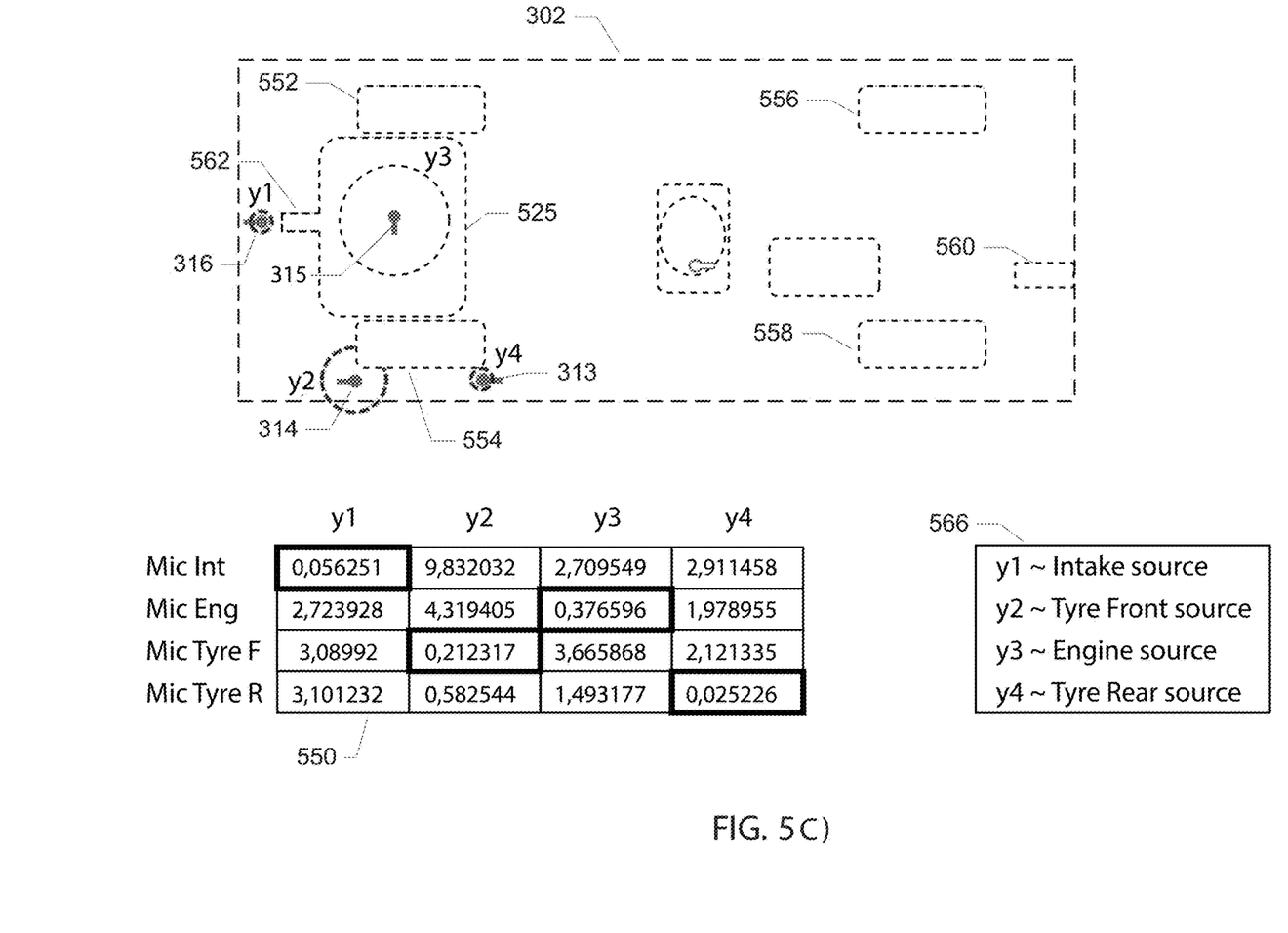

FIG. 5C) illustrates an alternative methodology for determining the appropriate label of each of the independent noise sound signals $y_1$-$y_N$ is based on spatial localization of each of the computed independent noise sound signals as described below. A simplified layout of the previously discussed car 302 is illustrated by left and right front tyres 552, 554 and back tyres 556, 558. The left front tyre 554 has reference microphones 314 and 313 placed at the front and back of the tyre 554 generating the noise sound signals labelled by "Mic TyreF" and "Mic TyreR", respectively, of a matrix of distance estimates 550. The simplified layout of the car 302 also comprises an exhaust pipe 560, an engine 525 and the air intake 562. The reference microphone 316 is placed adjacent to the air intake 562 and generates the noise sound signal $x_1$ labelled by "Mic in", while the reference microphone 315 is placed adjacent to the engine 525 and generates the noise sound signal $x_2$ labelled by "Mic Eng".

As mentioned before, the mixing filter matrix H (see FIG. 5A)) comprises respective transfer functions, each may be represented by a suitable linear mixing filter, between each of the independent noise sound signals $y_1$-$y_N$ and the recorded noise sound signals $x_1$-$x_N$. Consequently, respective phase differences at a specific reference frequency, such as 1 kHz, between a particular independent noise sound signal and the plurality of recorded noise sound signals may be determined. The computed phase differences are preferably converted to corresponding distance estimates between the particular independent noise sound signal and each of the recorded noise sound signals. This distance computation, estimation or determination may be carried out between each of the four independent noise sound signals $y_1$-$y_4$ for all of the recorded noise sound signals $x_1$-$x_4$ to determine the distance values of the matrix of distances 550 as illustrated on FIG. 5C). The distance values are in meters in this illustration.

From the cell values of the matrix of distances 550, the appropriate label of a particular independent noise sound signal may be determined for example by simple inspection as the label of the recorded noise sound signal which exhibits the shortest distance to the particular independent noise sound signal. For example, in the depicted matrix of distance estimates 550, the independent noise sound signal $y_1$ has the shortest distance, 0.056251, to the recorded noise sound signal $x_1$. Since, the recorded noise sound signal $x_1$ origins from the reference microphone 316 already labelled as "Mic int", the label "Mic int" is assigned to the independent noise sound signal $y_1$. The same procedure may be carried out for one or more of the residual independent noise sound signals $y_2$-$y_4$ to determine their appropriate labels. The appropriate label for each of the residual independent noise sound signals $y_2$-$y_4$ is indicated in the matrix of distance estimates 550 by greying of the relevant matrix cell or entry and leads to the assignment shown inside box 566. As illustrated the alternative methodology leads to the same or to a different labelling of the previously discussed labelling procedure based on power contribution distribution.

Figure 6:
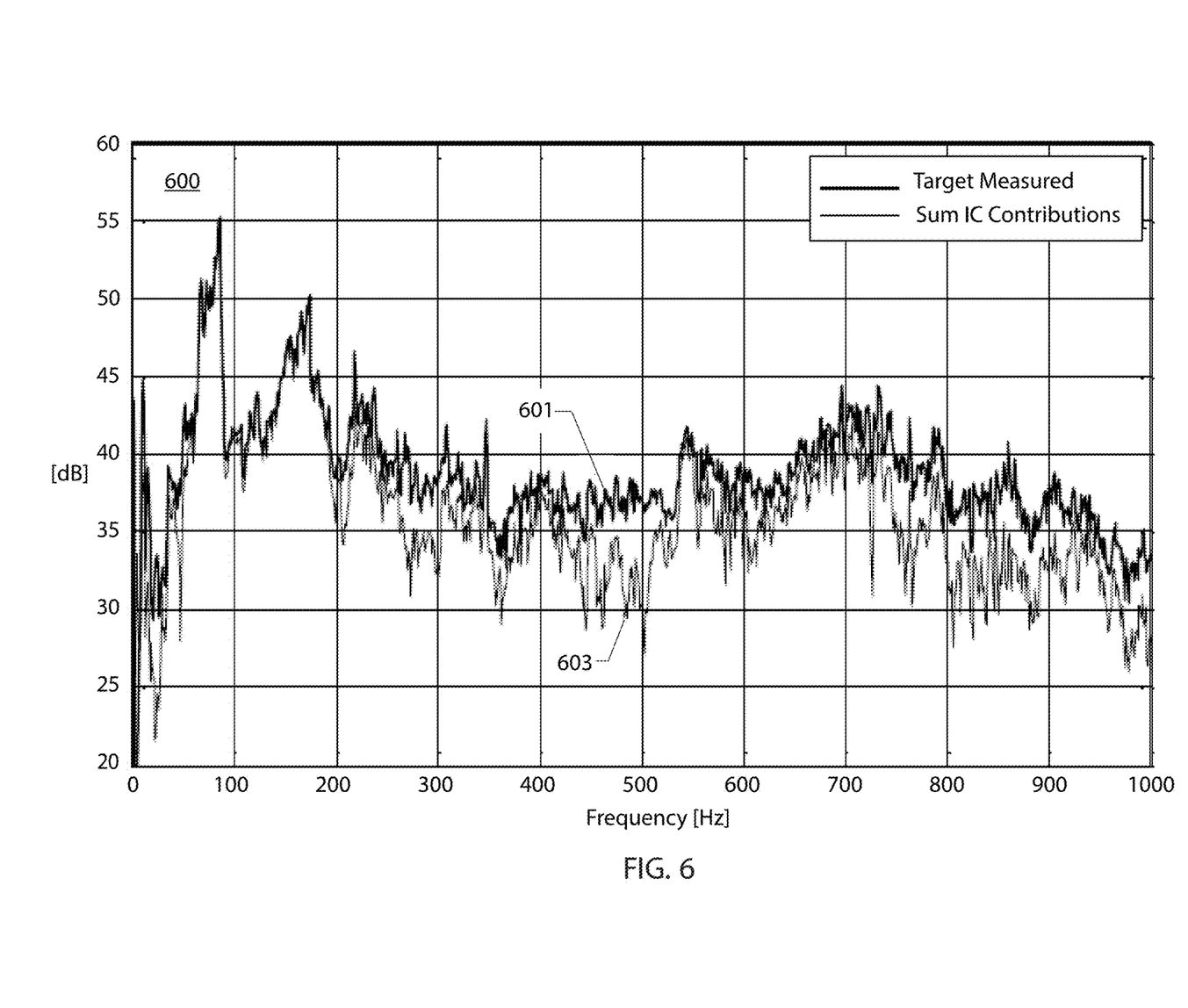
FIG. 6 is graph showing a frequency spectral based comparison between a sum of the four independent noise sound signals and the measured target noise signal.

FIG. 6 is graph 600 showing a power spectra based comparison between a sum of the above-discussed four individual target noise signal components of the independent noise sound signals $y_1$-$y_N$ and the measured target noise signal $p_1$. The y-axis shows the computed or measured sound power in dB and the x-axis indicates measurement frequency in Hertz from 0 Hz to 1 kHz on a linear scale. As mentioned above, the linear filters $Z_1$ (f)-$Z_N$ (f) can be used to verify that the sum of the individual noise sound components of the independent noise sound signals $y_1$-$y_4$ received at the outputs of the linear filters $Z_1$ (f)-$Z_N$ (f) with reasonable accuracy accounts for the entire signal level, e.g. signal power, in each of the recorded target noise sound signals such as $p_1$. In the opposite case, this indicates that the recorded target noise sound signal in question contains unaccounted noise sound components. Hence, a significant deviation between the entire signal power of the target noise sound signal in question and the combined signal power of the individual independent noise sound signals indicates that noise sound contribution from a significant physical noise source remains unrepresented by the computed independent noise sound signals. The test technician/engineer can use this information as consistency check or validation check and identify possible missing physical noise sources. The latter information can be used to reposition one or more of the reference microphones or add further reference microphones to the measurement set-up to pick-up or record a noise sound signal from a missing physical noise sound source. In the graph 600, power spectrum curve 601 "Target Measured" represents the experimentally measured power spectrum of the recorded target noise signal $p_1$ and power spectrum curve 603 "Sum IC Contributions" represents the power spectrum of the sum of the computed independent noise sound signals $y_1$-$y_4$. The skilled person will appreciate that the power spectra 601, 603 are quite coincident at frequencies below approximately 250 Hz while minor deviations in the order 2-5 dB are apparent at frequencies above 250 Hz.

REFERENCES

[1] Lars Kai Hansen and Mads Dyrholm "A PREDICTION MATRIX APPROACH TO CONVOLUTIVE ICA" in IEEE 2003.

[2] John G. Proakis and Dimitris G. Manolakis. Digital signal processing ($3^{rd}$ ed.): principles, algorithms, and applications. Prentice-Hall, Inc., Upper Saddle River, N.J., USA, 1996.

The invention claimed is:

1. A method of determining individual noise sound contributions of a plurality of physical noise sources of a motorized vehicle at a target location, comprising steps of:
   a) placing each one of a plurality of reference microphones at a distinct one of a plurality of reference positions adjacent to a distinct one of the physical noise sources, wherein the plurality of reference positions are outside the cabin of the motorized vehicle,
   b) placing a measurement microphone at the target location, wherein said target location is inside the cabin of the motorized vehicle or outside the cabin,
   c) actuating the motorized vehicle to obtain a predetermined operating condition,
   d) receiving and recording a plurality of noise sound signals generated from the plurality of reference microphones,
   e) receiving and recording a target noise signal generated from the measurement microphone at the target location,
   f) adaptively separating the plurality of noise sound signals using blind source separation to produce a plurality of mutually independent noise sound signals representing respective estimated noise sound signals of the plurality of physical noise sources,
   g) correlating, using a microprocessor or a digital signal processor, each of the mutually independent noise sound signals with the recorded target noise signal to determine time domain or frequency domain characteristics of a plurality of linear transfer path filters representing respective transfer functions between the plurality of independent noise sound signals and the measurement microphone at the target location,
   h) applying at least one of the independent noise sound signals, representing one of the physical noise sources, to at least one of the plurality of linear transfer path filters that corresponds to the at least one of the independent noise sound signals to generate at least one target noise signal component representing the individual noise sound contribution of the physical noise source at the target location, and storing the at least one target noise signal component in a signal recording device.

2. A method of determining individual noise sound contributions of a plurality of physical noise sources according to claim 1, comprising a further step of:
   i) reproducing the at least one target noise signal component through an audio reproducing device.

3. A method of determining individual noise sound contributions of a plurality of physical noise sources according to claim 2, comprising a further step of:
   j) listening to and evaluating a perceptual dimension or metric of the least one target noise signal component on a perceptually relevant scale wherein the perceptual dimension comprises at least one of {loudness, sharpness, roughness, fluctuation strength}.

4. A method of determining individual noise sound contributions of a plurality of physical noise sources according to claim 1, comprising a further step of:
   k) evaluating at least one perceptual dimension or metric of the least one target noise signal component by a sound quality assessment program using a predetermined psychoacoustic model of human hearing.

5. A method of determining individual noise sound contributions of a plurality of physical noise sources according to claim 1, wherein the blind source separation comprises steps of:
l) spatially and temporally de-correlating the plurality noise sound signals to provide a plurality of de-correlated or whitened noise sound signals,
m) applying instantaneous independent component analysis to the de-correlated or whitened noise sound signals to produce the plurality of mutually independent noise sound signals.

6. A method of determining individual noise sound contributions of a plurality of physical noise sources according to claim 1, wherein the blind source separation comprises steps of:
l1) applying multivariate auto-regressive modelling of the plurality noise sound signals by a set of autoregressive (AR) filters to obtain a plurality of de-correlated or whitened noise sound signals,
m1) applying instantaneous independent component analysis to the de-correlated or whitened noise sound signals to produce the plurality of mutually independent noise sound signals.

7. A method of determining individual noise sound contributions of a plurality of physical noise sources according to claim 1, wherein the target location of the measurement microphone is at an ear drum position of a human head and torso simulator embodied as a manikin.

8. A method of determining individual noise sound contributions of a plurality of physical noise sources according to claim 7, comprising a step of:
n) placing the human head and torso simulator at a driver's seat or a passenger's seat of the motorized vehicle during recording of the target noise signal at the target location.

9. A method of determining individual noise sound contributions of a plurality of physical noise sources according to claim 1, wherein the motorized vehicle comprises one of {a car, a truck, a van, a bus, a train, an airplane, a helicopter}.

10. A method of determining individual noise sound contributions of a plurality of physical noise sources according to claim 1, wherein the target location comprises a predetermined location outside of the motorized vehicle for measuring the noise emitted by road vehicles.

11. A method of determining individual noise sound contributions of a plurality of physical noise sources according to claim 1, comprising a step of: associating each of the plurality of independent noise sound signals with a label or attribute indicating its corresponding physical noise source.

12. A method of determining individual noise sound contributions of a plurality of physical noise sources according to claim 11, comprising further steps of:
correlating each of the mutually independent noise sound signals with the plurality of recorded noise sound signals generated by the plurality of reference microphones to determine time domain or frequency domain characteristics of a plurality of linear mixing filters representing respective transfer functions between each independent noise sound signal and the plurality of recorded noise sound signals,
applying each of the independent noise sound signals to the plurality of linear mixing filters to compute respective noise sound contributions to each of the plurality of recorded noise sound signals,
determining the label or attribute of each of the independent noise sound signals based on the computed noise sound contributions to the plurality of recorded noise sound signals.

13. A method of determining individual noise sound contributions of a plurality of physical noise sources according to claim 12, comprising further steps of:
computing a total signal power of the independent noise sound signals based on the computed noise sound contributions to the plurality of recorded noise sound signals.

14. A method of determining individual noise sound contributions of a plurality of physical noise sources according to claim 12, comprising further steps of:
for each of the independent noise sound signals comparing the respective computed noise sound contributions to the plurality of recorded noise sound signals,
associating the label or attribute of each of the independent noise sound signals with the label of the recorded noise sound signal possessing the largest contribution from the independent noise sound signal.

15. A method of determining individual noise sound contributions of a plurality of physical noise sources according to claim 12, comprising further steps of:
associating the label or attribute of each of the independent noise sound signals with the label of a recorded noise sound signal in which the independent noise sound signal exceeds a contribution of 50% in terms of signal noise power.

16. A method of determining individual noise sound contributions of a plurality of physical noise sources according to claim 11, comprising further steps of:
assigning a label to each of the plurality of recorded noise sound signals based on the reference position of the reference microphone,
correlating each of the mutually independent noise sound signals with the plurality of recorded noise sound signals generated by the plurality of reference microphones to determine time domain or frequency domain characteristics of a plurality of linear mixing filters representing respective transfer functions between each independent noise sound signal and the plurality of recorded noise sound signals,
determining respective phase differences between each of the mutually independent noise sound signals and the plurality of recorded noise sound signals from the time domain or frequency domain characteristics of the plurality of linear mixing filters,
for each of the independent noise sound signals determining based on the respective determined phase differences the recorded noise sound signal with the shortest distance to the noise sound signal,
assigning to each of the independent noise sound signals, the label of the recorded noise sound signal with the shortest distance.

17. A method of determining individual noise sound contributions of a plurality of physical noise sources according to claim 16, comprising further steps of:
converting the determined plurality of phase differences to a plurality of corresponding distances between each of mutually independent noise sound signals and the plurality of recorded noise sound signals.

18. A method of determining individual noise sound contributions of a plurality of physical noise sources according to claim 1 comprising further steps of:
applying the plurality of independent noise sound signals to the respective linear transfer path filters to generate corresponding individual noise sound components of the recorded target noise signal, determining a combined signal level of the individual noise sound components, comparing the combined signal level of the individual noise sound components with a corresponding signal level of the recorded target noise signal.

19. An acoustic measurement system for determining individual noise sound contributions of a plurality of physical noise sources of a motorized vehicle at a target location, comprising:

a plurality of reference microphones configured to be positioned at reference positions adjacent to a distinct one of the physical noise sources, wherein the plurality of reference positions are outside the cabin of the motorized vehicle, a measurement microphone configured to be positioned at the target location, wherein the target location is inside the cabin of the motorized vehicle or outside the cabin, a computerized measurement device comprising:

a plurality of microphone signal inputs and connectors connected to the plurality of reference microphones and the measurement microphone for receipt of a plurality noise sound signals generated from the plurality of reference microphones and a target noise signal generated by the measurement microphone, a signal recording device for storage of the plurality noise sound signals in digital format and the target noise signal in digital format, a user readable display for displaying various recorded signals and user interface variables, a programmable processor configured to, in accordance with a set of executable program instructions, perform steps of:

a1) adaptively separating the plurality of recorded noise sound signals using blind source separation to produce a plurality of mutually independent noise sound signals each representing an estimated noise sound signal of one of the physical noise sources, b1) correlating each of the mutually independent noise sound signals with the recorded target noise signal to determine time domain or frequency domain characteristics of a plurality of linear transfer path filters representing respective transfer functions between the plurality of independent noise sound signals and the measurement microphone at the target location, c1) applying at least one of the independent noise sound signals, representing one of the physical noise sources, to at least one of the plurality of linear transfer path filters that corresponds to the at least one of the independent noise sound signals to generate at least one target noise signal component representing the individual noise sound contribution of the physical noise source at the target location, the system further comprising a signal recording device storing the at least one target noise signal component.

20. An acoustic measurement system according to claim 19, wherein the processor is further configured to:

d1) retrieve the at least one stored target noise signal component from the signal recording device and reproducing the at least one stored target noise signal component through an audio output port accessible to the computerized measurement device.

\* \* \* \* \*